Patented Apr. 21, 1931

1,801,764

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS OF TREATING RUBBER AND PRODUCTS OBTAINED THEREBY

No Drawing. Original application filed March 2, 1928, Serial No. 258,670. Divided and this application filed March 2, 1928. Serial No. 258,677.

This invention relates to the treatment of rubber and similar materials and to the products obtained thereby. The invention is more particularly concerned with new classes of chemical compounds capable of functioning as accelerators of vulcanization. This case is a division of copending application Serial No. 258,670, filed of even date.

Accordingly the objects of the invention include the vulcanization of rubber treated with the hereinafter described classes of compounds. Another object is to provide new chemical compounds, particularly useful in vulcanization, which are comparatively inexpensive and at the same time highly efficient both from the standpoint of their behavior during the compounding of rubber as well as in the properties which they impart to the vulcanized product. Another object of the invention is to accelerate the action of the new chemical compounds by the addition of base or to retard their action by the addition of acid material. A further object of the invention is to provide a method whereby the acid or base or the new compounds themselves may be introduced into rubber.

In the present practice of the use of accelerators, it is generally known that many of the compounds employed are so powerful that they cause a prevulcanization, or burning on the mixing mill. This serious disadvantage is possessed by many of the accelerators which have the property of vulcanizing rubber at ordinary temperatures or at temperatures well below those ordinarily employed in hot vulcanization, for example at 212° F. or thereabouts. Illustrations of such rapid accelerators are metallic dithiocarbamates, metallic salts of other thioacids, mercapto thiazoles and the like. According to the present invention this serious objection of prevulcanization may be entirely overcome, the rubber compounds may be mixed upon the mill with practically no danger of prevulcanization thereon, without sacrificing the accelerating power which is desired. Certain of the compounds forming the subject matter of the present invention may be mixed with rubber with entire safety on the mixing mills, subject to the conditions hereinafter named, whereas others may be safely mixed, observing certain precautions as to mill temperature, etc.

The invention includes combining rubber and similar vulcanizable materials with a vulcanizing combination including a vulcanizing agent, a metallic oxide or its equivalent, and an organic derivative of a thiazole, which derivative hydrolyzes with sodium hydroxide in boiling aqueous alcohol at least as rapidly as diphenyl methyl dimethyl dithiocarbamate reacts under the same conditions. The invention includes treating rubber with a compound containing the group

where R and X are sulphur and nitrogen respectively, i. e.,

The invention further includes the products thus obtained, and also the preparation of the chemical compounds themselves.

The invention further consists in accelerating the action of the compounds by the addition of basic materials and in retarding the action of the compounds and particularly the burning of the compounds by the addition of acid material. The invention further consists in introducing basic materials or acid materials or the compounds herein disclosed by diffusion from rubber or from any surrounding medium.

The thiazoles subject of the present invention are shown as having the hydrogen of the mercapto or mercaptan group substituted by the following organic groups:

2-4 dinitrophenyl, 2-6 dinitro 4 chlor phenyl, picryl, triphenylmethyl, trimethylmethyl, phenyl methtylene bis, benzal bis, allyl, phenyl chlor methylene bis. The substitution is on the Y of

The compounds contain the group

and may be written

The first three of these groups have one nitro group ortho to the bond connecting the phenyl group with the CS group, and at least one of the remaining substitutents meta to the nitro group. In the dinitro phenyl compounds, the two nitro groups are meta to each other, and one of them is ortho to the bond connecting the phenyl group with the CS group in the accelerating substance.

In all cases the entire compound reacts at least as rapidly with sodium hydroxide in boiling aqueous alcohol as diphenylmethyl dimethyl dithiocarbamate reacts under the same conditions. All the compounds which react with sodium hydroxide at least as rapidly as diphenylmethyl dimethyl dithiocarbamate, accelerate vulcanization, in the presence of a metallic oxide, such as zinc oxide or an equivalent metallic compound.

Zinc oxide is a good illustration of a metallic oxide which may be used. In place of zinc the following elements may be used in any combined form preferably somewhat basic and soluble in rubber mercury preferably in the mercuric state, lead preferably in the plumbous state, cadmium, copper preferably in the cupric state, arsenic preferably in the arsenous state, manganese preferably in the manganous state. Preferably the metallic compound is of such a nature that the metallic element is available during the vulcanization process. Oxides, stearates, carbonates are among the metallic compounds which may be used.

As an embodiment one may mix 100 parts of pale crepe, 10 parts of zinc oxide, 3 parts of sulphur and 1½ parts of 2,4 dinitrophenyl benzothiazylsulphide. This stock resists burning on the mill and is well vulcanized after heating for 60 minutes under 20 pounds steam pressure or for 60 minutes under 40 pounds steam pressure. This stock does not deteriorate as rapidly as similar stocks employing other accelerators such as the dimethyl dithiocarbamate compounds, for instance. The 2-4 dinitrophenyl benzothiazyl sulphide works well in air cures and with litharge.

The 2-4 dinitrophenyl benzothiazylsulphide may be prepared as follows:

40 grams of sodium hydroxide are dissolved in 500 grams of water and 168 grams of mercapto benzothiazole and 500 cc. of 95% alcohol are added. The mixture is heated to 50–60° C. until all the mercapto benzothiazole has dissolved. The sodium salt of mercaptobenzothiazole is thereby formed. 202½ grams of dinitrochlorbenzol are then added and the mixture heated under a reflux condenser until the dinitrochlorbenzol has disappeared. The mixture is then cooled and the 2-4 dinitrophenyl benzothiazylsulphide which precipitates out is removed by filtration, washed free of sodium chloride, dried and ground. The melting point should be 156–157° C. On further purification the melting point is 162½° C. The other compounds conforming to the general formula

may be prepared in like manner, that is reacting the solution of the sodium salt of the thioacid or thiazole with a chloride of the group Y. In the case of picryl benzothiazyl sulphide the chloride would be trinitrochlorbenzol instead of dinitrochlorbenzol.

The compounds disclosed herein function well when the cure is carried out according to any of the commercial methods such as in steam, talc, water, etc.

I have observed that the action of the compounds disclosed herein is accelerated by the presence of a small amount of a basic material such as sodium hydroxide, trisodium phosphate, dicyandiamide, piperidine, aniline, dibenzylamine, piperazine hydrate, triethanolamine. The action of the basic substances is particularly marked in the case of the polynitrophenyl compounds such as 2, 4 dinitrophenyl benzothiazyl sulphide. The use of the base lowers the temperature at which the accelerator functions or increases its speed of functioning and usually increases the tensile strength at all temperatures of vulcanization by about 10%.

The base may be employed in amounts generally less than 1% or thereabouts.

The effect of the alkali on these dinitrophenyl compounds is much more marked than it is upon other accelerators such as tetramethylthiuram monosulphide, diphenylguanidine, acetaldehyde aniline condensation product or heptaldehyde aniline condensation product.

Since a basic substance accelerates the action of the accelerator and lowers the temperature at which it functions, it also increases the speed of burning on the mixing mill. Therefore the greater the amount of base present in the mix, the greater the danger of burning on the mixing mill and rubbers which are alkaline therefore accelerate the action of these compounds. Burning on the mixing mill is one form of what is herein called premature vulcanization. The latter expression also includes the burning, scorching, or setting up of the stock on mills, calenders, tubing machines, as well as any prevulcanization which may occur or be incipient prior to the actual deliberate vulcanization operation. This is particularly true of the dinitrophenyl compounds.

On the other hand the addition of acid retards the action of the accelerator and therefore improves its resistance to burning. Here again the action is particularly marked in the case of the polynitrophenyl compounds. For instance .1 part of monochlor acetic acid added to the stock given above so effects the action of the accelerator that after 60 minutes at 5 pounds steam pressure, no cure was obtained and after 60 minutes at 40 pounds steam pressure the tensile was 2380 pounds. If .5 part of monochlor acetic acid were used no cure was obtained even after 60 minutes at 40 pounds steam pressure. Other acids which I have successfully employed are sulphanilic, oxalic, picric, phosphoric, trichloracetic, para toluene sulphonyl chloride and pine tar. I have also successfully employed substances which may form acids during the course of vulcanization such as ethyl oxalate or zinc acetate.

Since the presence of acid retards the action of compounds disclosed herein and particularly the action of the polynitrophenyl compounds, the addition of an appropriate amount of acid serves to increase the resistance to burning so much as may be desired. Mixes which are slightly acid because of the presence of carbon black or pine tar resist burning on the mill abnormally well. The vulcanization of rubbers which are acid by nature, or contain appreciable amounts of acid or acidic ingredients, is not accelerated so well by the herein described compounds unless the acidic property be first removed or neutralized.

Likewise, rubbers or rubber stocks which are appreciably basic by nature, or contain basic materials, may display a marked, often undesirable tendency towards prevulcanization. Such basic rubbers or stocks may be treated with acidic material to remove, to curb, or to control this tendency to prevulcanize. Therefore, by the use of basic material and acidic material in suitable proportions as required, any rubber or stock may be brought to a predetermined speed of vulcanization.

Instead of adding on the mixing roll the basic materials intended to activate the compounds or accelerate their action, one may permit the basic material to diffuse into the rubber. For instance if the stock given above for vulcanization in the air be vulcanized in air containing ammonia, the vulcanization is greatly accelerated and the surface of the stock is remarkably hard and resistant to marring. The introduction of the basic material may be made on the mill by diffusion from a liquid, solution, or gas, or from adjoining rubber stock or from a fabric.

As another example, I make the compounds, in the usual manner consisting of 100 parts of pale crepe, 10 parts of zinc oxide, 3 parts of sulphur and 2 parts of dinitrophenyl benzo thiazyl sulphide. This stock in the form of a sheet .060″ thick or in the form of an article may be treated with gaseous ammonia for 16 hours. Thereafter it will vulcanize at 212° F., much more rapidly than a stock not so treated. Instead of gaseous ammonia, I may employ aqueous ammonia, aqueous diethylamine, aqueous aniline or dimethylamine or aniline vapor. It is believed that these alkaline materials diffuse into the rubber and accelerate the action of the dinitrophenyl benzo thiazyl sulphide.

As an example of the introduction by diffusion of the basic material as well as the introduction by diffusion of some of the compounds disclosed herein, the following illustration is given: 100 parts of pale crepe, 10 parts of zinc oxide, 3 parts of sulphur, 1 part of 2,4 dinitrophenyl benzo thiazyl sulphide, and .2 part of monochlor acetic acid are mixed to form one stock which is calendered to a thickness of .010″. Another stock is made up of 100 parts of pale crepe, 10 parts of zinc oxide, 3 parts of sulphur and 4 parts of dibenzylamine. This stock is mixed on the mills in the usual manner and calendered to a thickness of .010″. The two stocks are plied up alternately using 3 plies of each and allowed to stand for 24 hours to permit the diffusion of the dibenzylamine into the dinitrophenyl stock and of the dinitrophenyl benzo thiazyl sulphide into the dibenzylamine stock. Thereafter the plied up stock is heated at 212° and it is found that vulcanization occurs much more quickly than it does for the individual stocks which have not been plied up. It will be observed that the dibenzylamine acts to neutralize the monochlor acetic acid as well as to activate the dinitrophenyl benzo thiazyl sulphide.

As pointed out before the presence of the monochlor acetic acid improves the resistance to burning but the procedure may be carried out without the use of the acid.

Other compounds disclosed herein may be substituted for the compounds given above.

The basic material (ammonia, etc.) may be introduced from the surrounding medium such as air or water to neutralize the acid, and/or to activate the accelerator. For instance if .2 part of acid be added to the stock for air cure given above, and the stock be cured in air containing ammonia gas the ammonia will not only neutralize the acid but will activate the dinitrophenyl compound. The basic material may be introduced in any desired manner at any time prior to complete vulcanization, i. e., it may be introduced during vulcanization as a gas or vapor, or it may be applied to the stock by painting, dipping, or blending in cement form etc. before the stock is subjected to vulcanization, or the stock may be vulcanized in a solution or suspension of the basic material.

Any of these ingredients, base, acid, and accelerator may be brought together in the form of cements, i. e. a cement containing accelerator may be mixed with a cement containing the base at the time the cement is to be used. The accelerator cement will not vulcanize appreciably at ordinary temperatures if the base be absent. Likewise, an accelerator-containing cement may be preserved in an unvulcanized condition for a long period by the addition of acid (as such, in solution, or in a cement). When vulcanization is desired, a base may be added (as such, in solution, or in a cement) and vulcanization will then take place.

It is believed that the dinitrophenyl compounds are particularly susceptible to the action of acids and alkalies because the dinitrophenyl compounds of all sorts of acids such as dimethyl dithiocarbamic acid or hydrochloric acid do not hydrolyze in acid solution but do hydrolyze only in alkali solution.

Further examples include organic derivatives of thiazoles.

Picryl benzothiazyl sulphide (M. P. 152° C.) the probable formula of which is:

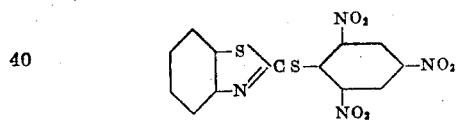

2,6 dinitro 4 chlorophenyl benzothiazyl sulphide (M. P. 167° C.).

Allyl benzothiazyl sulphide (B. P. 145–148° C.).

Diphenylmethylbenzothiazyl sulphide. (M. P. 108° C.).

Phenyl methylene bis benzothiazyl sulphide (benzal bis benzothiazyl sulphide).

These compounds illustrate compounds in which R and X of the formula

are joined, as part of a ring. In this instance the general formula may be written

and more specifically

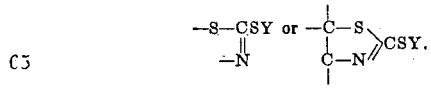

All of the above compounds are new chemicals, not recorded in the literature. The preparation of these materials forms the subject matter of separate applications.

All of the above mentioned compounds are accelerators of vulcanization. Some of them give high tensile strength and other valuable physical properties such as improved resistance to abrasion, ageing, and other properties. The claims are therefore to be broadly interpreted as including such treatment of rubber in any form (solid, solution, dispersion) for these purposes as well as for vulcanization, in which latter instance, it is understood that a vulcanizing agent and a metallic oxide or its equivalent will be added to the rubber. It is of course understood that not all of these compounds are of equal accelerating strength, pound for pound, under identical vulcanizing conditions. These accelerators may be used in conjunction with any of the known antioxidants, age improvers, and other materials introduced into rubber to improve ageing and other physical properties.

Diphenyl methyl benzo thiazyl sulphide and allyl benzo thiazyl sulphide may also be classed as accelerators, but the degree of acceleration is very small, and at present is regarded as of no commercial importance. Methyl benzo thiazyl sulphide is one example of a compound which does not hydrolyze as rapidly as diphenyl methyl dimethyl dithiocarbamate in the herein described test, and the pure compound did not accelerate vulcanization under the conditions given above as examples.

The compounds in general may be used in amounts varying between ½ and 4 parts on 100 parts of rubber, depending of course on the type of stock, etc.

The rate of reaction of the compound with sodium hydroxide in boiling aqueous alcohol may be determined as follows:

.00125 moles of the compound is weighed into a 50 cc. Erlenmeyer; 25 cc. 95% alcohol and .00125 moles sodium hydroxide in the form of an approximately normal solution are added and the solution brought to the boiling point as quickly as possible and kept there for exactly 30 minutes. The solution is then cooled quickly and titrated with approximately N/10 acid, using phenolphthalein as the indicator. Carbon dioxide-free water should be used throughout. A blank should be run in order to check up on the amount of acid necessary to neutralize the sodium hydroxide when no compound is used. The decrease in hydroxyl ion content during the boiling is taken as a measure of the extent of the reaction with sodium hydroxide.

The above procedure constitutes a method whereby the relative rate of hydrolysis of any given compound of the types disclosed may be compared with that of diphenylmethyl dimethyl dithiocarbamate.

The diphenylmethyl dimethyl dithiocarbamate may be prepared in accordance with the general procedure indicated herein, that is reacting an alcoholic solution of a salt (preferably the sodium salt) of dimethyl dithiocarbamic acid with diphenyl chloromethane. Diphenylmethyl dimethyl dithiocarbamate separates as an oil which solidifies and crystallizes on standing over night and may be purified by recrystallization from alcohol. It has a melting point of 96.5–97° C.

It is known that the rate of hydrolysis of organic compounds, or more exactly, their rate of reaction with a base such as sodium hydroxide varies with the substituent in the organic compound. This variation has been utilized in the present invention.

Having thus described my invention, what I claim and desire to protect by Letters Patent is:

1. A rubber product derived from rubber combined with a metallic oxide, a vulcanizing agent and a compound comprising the group

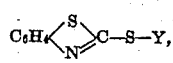

Y being a trinitrophenyl group, which said compound is capable of hydrolyzing at the S—Y bond in aqueous alcohol in the presence of sodium hydroxide at least as rapidly as diphenyl methyl dimethyl dithiocarbamate under the same conditions.

2. A vulcanized rubber product derived from rubber combined with zinc oxide, sulphur and a compound comprising the group

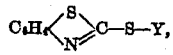

R being an ortho-arylene group, which said compound is capable of hydrolizing at the S-trinitrophenyl bond in aqueous alcohol in the presence of sodium hydroxide at least as rapidly as diphenyl methyl dimethyl dithiocarbamate under the same conditions.

3. A method of treating rubber which comprises vulcanizing rubber containing a metallic oxide and a vulcanizing agent in the presence of a compound including the group

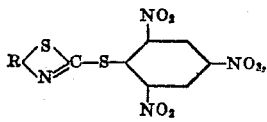

Y being a trinitrophenyl group, which said compound is capable of hydrolizing at the S—Y bond in aqueous alcohol in the presence of sodium hydroxide at least as rapidly as diphenyl methyl dimethyl dithiocarbamate under the same conditions.

4. A method of treating rubber which comprises vulcanizing rubber containing a metallic oxide and a vulcanizing agent in the presence of a compound including the group

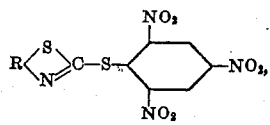

R being an ortho-arylene group, which said compound is capable of hydrolizing at the S-trinitrophenyl bond in aqueous alcohol in the presence of sodium hydroxide at least as rapidly as diphenyl methyl dimethyl dithiocarbamate under the same conditions.

5. A vulcanized rubber product derived from rubber combined with zinc oxide, sulphur and a 2-4-6 trinitrophenyl benzo thiazyl sulphide.

6. A method of treating rubber which comprises vulcanizing rubber containing zinc oxide and sulphur in the presence of a 2-4-6 trinitrophenyl benzo thiazyl sulphide.

Signed at New York, New York, this 23rd day of February, 1928.

SIDNEY M. CADWELL.